United States Patent
Tokuhara

(10) Patent No.: US 7,574,116 B2
(45) Date of Patent: Aug. 11, 2009

(54) OPTICAL DISC APPARATUS

(75) Inventor: Katsuo Tokuhara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1068 days.

(21) Appl. No.: 10/423,928

(22) Filed: Apr. 28, 2003

(65) Prior Publication Data

US 2003/0215223 A1 Nov. 20, 2003

(30) Foreign Application Priority Data

May 13, 2002 (JP) ............................ P2002-137077

(51) Int. Cl.
*H04N 7/087* (2006.01)
*H04N 5/00* (2006.01)
(52) U.S. Cl. .......................... 386/125; 386/84
(58) Field of Classification Search .................. 386/1, 386/66, 70, 71, 84, 125–126
See application file for complete search history.

(56) References Cited

U.S. PATENT DOCUMENTS

| | | | |
|---|---|---|---|
| 5,648,962 A | * | 7/1997 | Pirinen ........................ 370/336 |
| 5,699,370 A | * | 12/1997 | Kaniwa et al. .............. 714/811 |
| 6,216,201 B1 | | 4/2001 | Ado et al. |
| 6,904,008 B2 | * | 6/2005 | Kawashima et al. ..... 369/47.15 |
| 7,327,942 B2 | * | 2/2008 | Ko et al. ........................ 386/96 |

FOREIGN PATENT DOCUMENTS

| | | |
|---|---|---|
| EP | 0 953 486 | 11/1999 |
| JP | 4-83439 | 3/1992 |
| JP | 5-217287 | 8/1993 |
| JP | 10-106141 | 4/1998 |
| JP | 11-317009 | 11/1999 |
| JP | 2000-57712 | 2/2000 |
| JP | 2000-285601 | 10/2000 |
| JP | 2000-324163 | 11/2000 |
| JP | 2001-155432 | 6/2001 |

* cited by examiner

*Primary Examiner*—Thai Tran
*Assistant Examiner*—Nigar Chowdhury
(74) *Attorney, Agent, or Firm*—Morgan, Lewis & Bockius LLP

(57) ABSTRACT

PCM data with time information is read out by an ATAPI controller 4. PCM data with time information is read out from the ATAPI controller 4 into an AV decoder 11 while ascertaining coincidence between the amount of transmitted data and that of received data. The time information is output in synchronization with the PCM data. Therefore, PCM data and time information can be easily synchronized with each other, and a dedicated line for PCM data can be omitted.

1 Claim, 5 Drawing Sheets

OPTICAL DISC APPARATUS

BACKGROUND OF THE INVENTION

The present invention relates to an optical disc apparatus, and more particularly to an optical disc apparatus which can read out PCM data.

In an optical disc apparatus which reproduces video data and/or audio data from a DVD (Digital Versatile Disc) and further records video data and/or audio data onto a DVD, usually, transmission and reception of data are controlled by an ATAPI controller or a SCSI controller. Many of such optical disc apparatuses can perform reproduction of PCM data recorded on a CD (Compact Disc) in addition to reproduction of data from a DVD.

FIG. 1 shows a first example of a conventional optical disc apparatus. In the optical disc apparatus, when data is to be reproduced from a DVD, reading of data is controlled by an ATAPI controller 4, data of a predetermined number of bits is read out each time by an AV decoder 11, and the data is then processed by a vide encoder 13 to be output from the apparatus. Data which is input trough an antenna or from an external apparatus is compressed into the MPEG2 format by an AV encoder 25, and then recorded onto an optical disc while recording is controlled by the ATAPI controller 4. When data is to be reproduced from a CD, PCM data is transmitted to a switching section SW through a dedicated line 31 which is connected to a front-end section 3, and a sub Q code (time information) is transmitted to the switching section SW via the ATAPI controller 4 and the AV decoder 11. As a result of switching of signal paths by the switching section SW, the PCM data and the sub Q code (time information) are supplied in synchronization to a DIT 15. In the DIT 15, digital audio data is produced from the PCM data and the time information, and then output through an S/P DIF terminal.

FIG. 2 shows a second example of a conventional optical disc apparatus. The second example is configured in the same manner as the first example except that, in place of the dedicated line 31 which is connected to the front-end section 3 in the first example, a dedicated line 41 is connected to the ATAPI controller 4. When data is to be reproduced from a CD, PCM data is read into the ATAPI controller 4, and then transmitted to the switching section SW through the dedicated line 41, and a sub Q code (time information) is transmitted to the switching section SW via the ATAPI controller 4 and the AV decoder 11. As a result of switching of signal paths by the switching section SW, the PCM data and the sub Q code (time information) are supplied in synchronization to the DIT 15.

In the first and second examples, PCM data which is transmitted through the dedicated line 31 or 41 is synchronized with time information which is transmitted through another path, by switching of the signal paths by the switching section SW. Therefore, it is difficult to control synchronization of the PCM data and the time information, and the synchronization cannot be sometimes sufficiently attained.

An apparatus for reproducing in synchronization video data and audio data is disclosed in the Unexamined Japanese Patent Application Publication No. 2000-324163. In the disclosed apparatus, time information which is added in recompression of video data is added also to a packet containing audio data which is to be reproduced at the same timing, whereby the video data and the audio data are synchronized with each other. However, the above-mentioned publication discloses only a configuration for synchronizing video and audio data in the MPEG2 format which are recorded on a DVD, and teaches nothing about a configuration for, in an optical disc apparatus which can reproduce data from a DVD, synchronizing PCM data recorded on a CD with time information.

SUMMARY OF THE INVENTION

It is an object of the invention to facilitate synchronization of PCM data and time information in an optical disc apparatus for a DVD and a CD.

The optical disc apparatus of the first invention is an optical disc apparatus which can perform recording and reproduction on a DVD and reproduction on a CD, which comprises an ATAPI or a SCSI that controls transmission and reception of data to and from the DVD or the CD, and which outputs in synchronization PCM data that is transmitted through a dedicated line, and time information that is transmitted through a path other than the dedicated line. The optical disc apparatus is characterized in that PCM data with the time information is read out by the ATAPI or the SCSI, the PCM data with the time information is read out from the ATAPI or the SCSI to an AV decoder or an AV codec while ascertaining coincidence between an amount of transmitted data and an amount of received data, and the time information and the PCM data are output in synchronization.

According to the first invention, in an optical disc apparatus which can perform recording and reproduction on a DVD and reproduction on a CD, when data is to be reproduced from a CD, PCM data with sub Q data is read out by the ATAPI or the SCSI, and therefore PCM data and time information can be easily synchronized with each other.

Since the data is read out from the ATAPI or the SCSI to the AV decoder or the AV codec while ascertaining coincidence between an amount of transmitted data and that of received data, synchronization of the PCM data and the time information can be prevented from being lost by the influence of noises or the like.

Since a dedicated line is not required for reading out PCM data, the configuration can be simplified, and the production cost can be lowered.

The optical disc apparatus of the second invention is an optical disc apparatus which can reproduce data from first and second optical discs, wherein the apparatus comprises: an ATAPI or a SCSI which reads out video data and/or audio data recorded on the first optical disc, and which reads out PCM data with time information recorded on the second optical disc; and an AV decoder or an AV codec which is connected to the ATAPI or the SCSI, which decodes the video data and/or the audio data, and which reads out the PCM data with time information from the ATAPI or the SCSI.

According to the second invention, in an optical disc apparatus which can reproduce data from first and second optical discs, PCM data with sub Q data is read out by the ATAPI or the SCSI, and therefore PCM data and time information can be easily synchronized with each other.

Since a dedicated line is not required for reading out PCM data, the configuration can be simplified, and the production cost can be lowered.

The optical disc apparatus of the third invention is an optical disc apparatus which, in the optical disc apparatus of the second invention, further comprises a controlling section which ascertains whether an amount of transmitted data of the ATAPI or the SCSI coincides with an amount of received data of the AV decoder or the AV codec or not.

In this case, the data is read out from the ATAPI or the SCSI to the AV decoder or the AV codec while ascertaining coincidence between an amount of transmitted data and that of received data, and therefore synchronization of the PCM data and the time information can be prevented from being lost by the influence of noises or the like.

The optical disc apparatus of the fourth invention is an optical disc apparatus which, in the optical disc apparatus of the third invention, further comprises a recording section which records video data and/or audio data onto the first optical disc, via the ATAPI or the SCSI.

In this case, the optical disc apparatus which can perform recording on the first optical disc in addition to reproduction on the first and second optical discs can attain the same effects as those of the third invention.

The optical disc apparatus of the fifth invention is an optical disc apparatus which, in the optical disc apparatus of any one of the second to fourth inventions, the first optical disc is a DVD, and the second optical disc is a CD. In this case, the optical disc apparatus for a DVD and a CD can attain the effects of any one of the first to third inventions.

DETAILED DESCRIPTION OF THE PREFERRED EMBODIMENTS (1) Configuration

Figure 1:
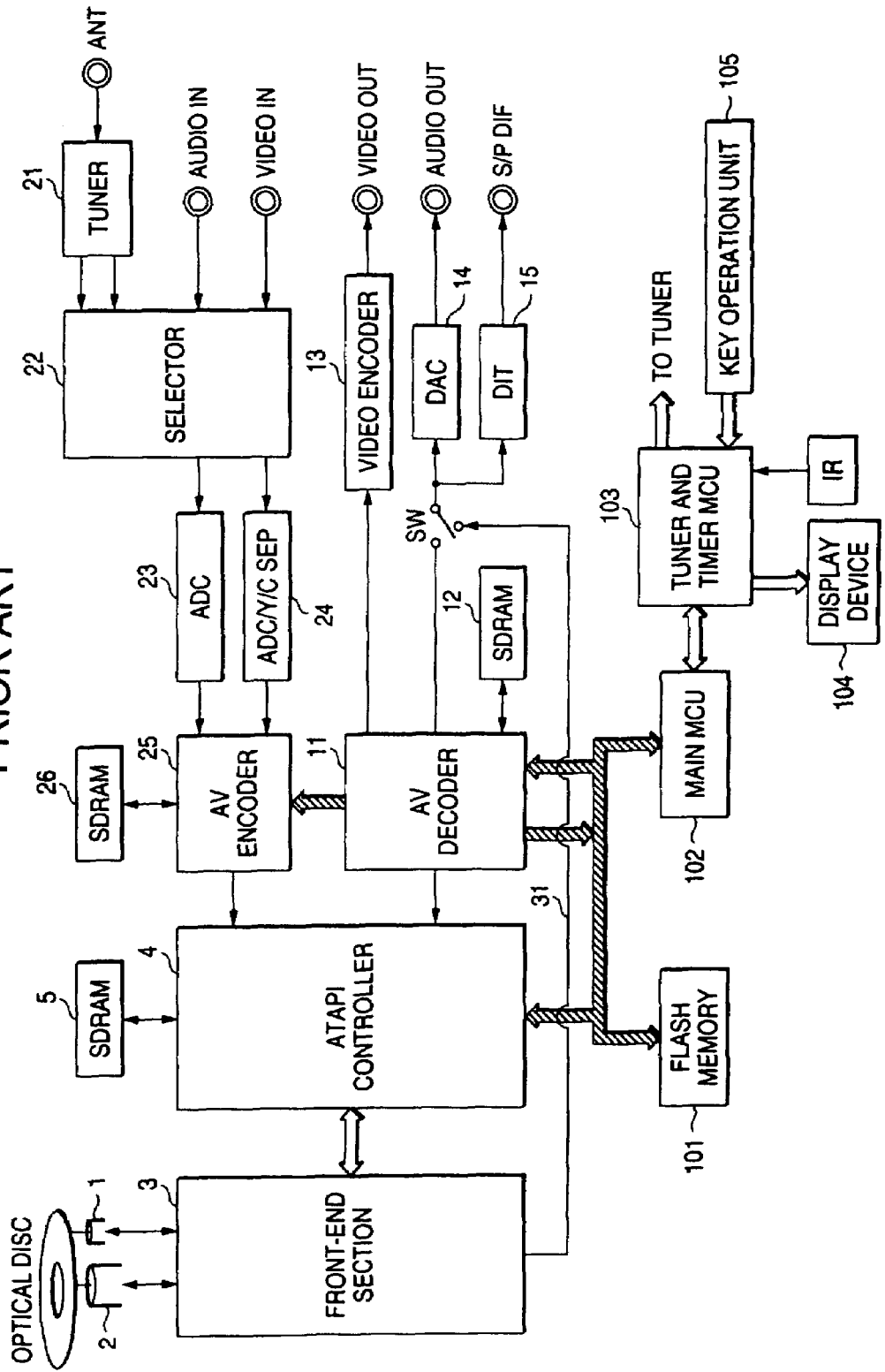
FIG. 1 is a diagram showing a first example of a conventional optical disc apparatus.
Figure 2:
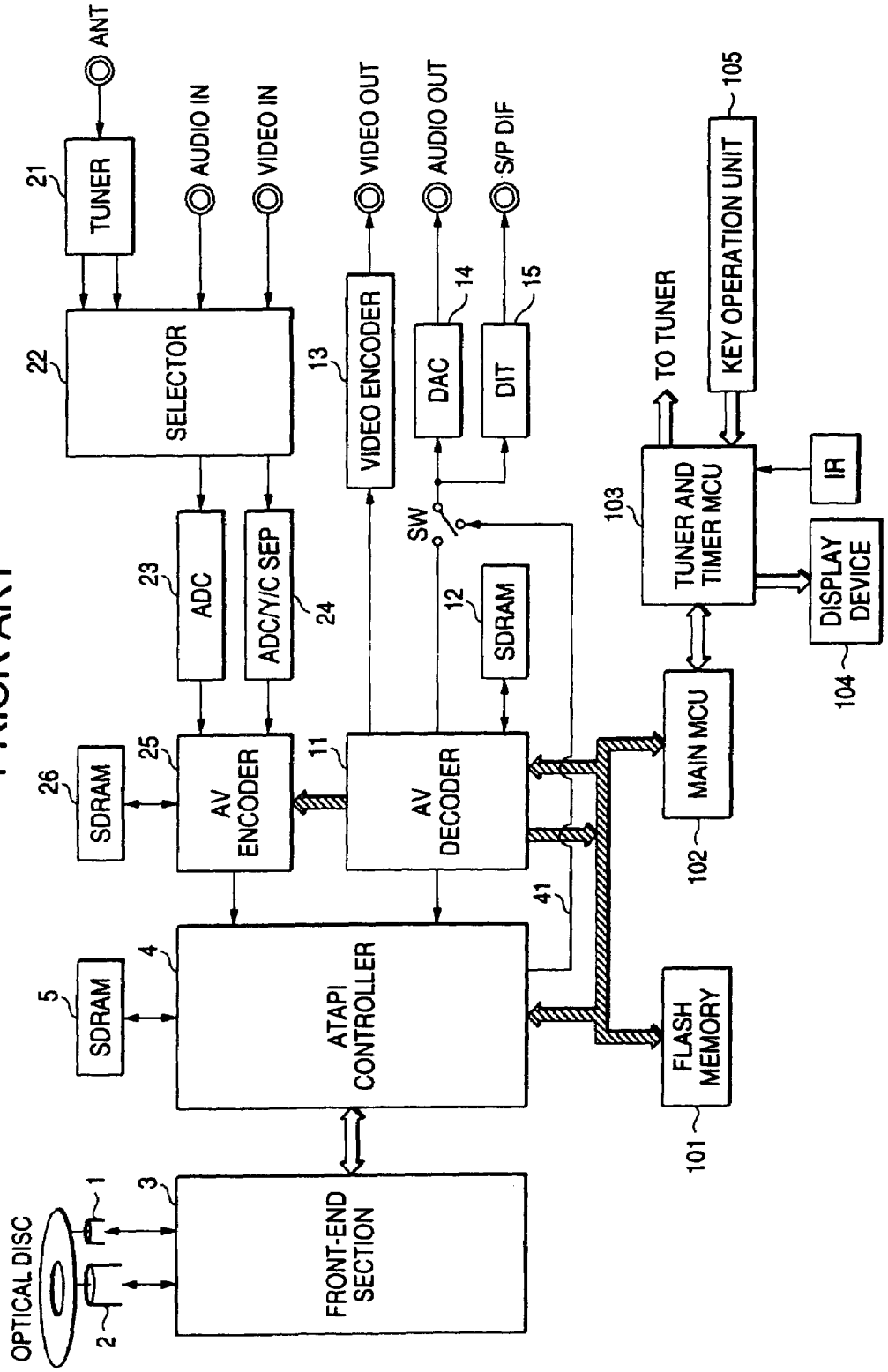
FIG. 2 is a diagram showing a second example of a conventional optical disc apparatus.
Figure 3:
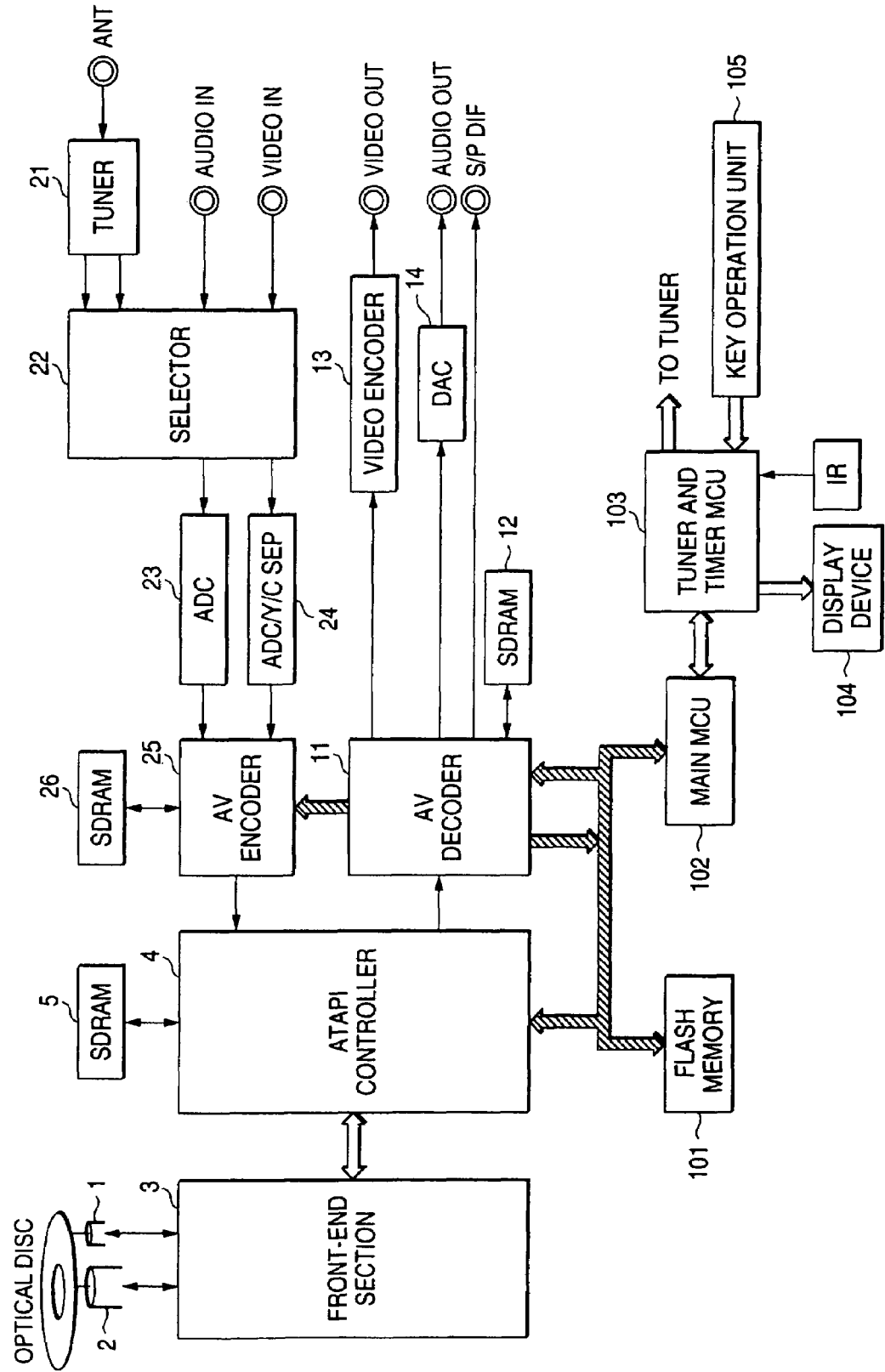
FIG. 3 is a diagram showing an optical disc apparatus which is an embodiment of the invention.

FIG. 3 shows an optical disc apparatus which is an embodiment of the invention. In the embodiment, the optical disc is a DVD (Digital Versatile Disc) or a CD (Compact Disc).

The optical disc apparatus comprises: an optical pickup 1 consisting of a laser device and a photodetector; a rotation driving mechanism 2; and a front-end section 3 which controls the optical pickup 1 and the rotation driving mechanism 2.

An ATAPI controller 4 is connected to the front-end section 3, and an SDRAM 5 is connected to the ATAPI controller 4. The ATAPI controller 4 may be replaced with another interface such as a SCSI controller. An AV decoder 11 is connected to the ATAPI controller 4. An SDRAM 12, a video encoder 13, and a DA converter 14 are connected to the AV decoder 11. An AV encoder 25 is connected to the ATAPI controller 4. An SDRAM 26, an AD converter 23, and an ADC/Y/C separator 24 are connected to the AV encoder 25. The AD converter 23 and the ADC/Y/C separator 24 are connected to a selector 22. The selector 22 is connected to an antenna via a tuner 21. The selector 22 is connected also to an AudioIN terminal and a VideoIN terminal. The optical disc apparatus further comprises a flash memory 101, a main MCU 102, a tuner and timer MCU 103, a display device 104, and a key operation unit 105.

Figure 4:
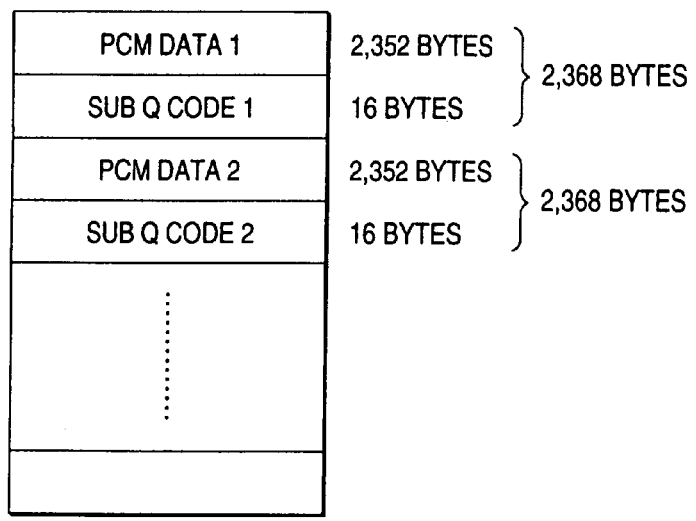
FIG. 4 is a diagram showing an example of the data configuration in an SDRAM 5.

The ATAPI controller 4 controls transmission and reception of data to and from the front-end section 3. The SDRAM 5 temporarily stores data which is to be transmitted and received by the ATAPI controller 4. FIG. 4 shows an example of the data configuration of PCM data with a sub Q code (time information) which are stored in the SDRAM 5 when audio data recorded on a CD is reproduced. As shown in the figure, the ATAPI controller 4 sequentially stores PCM data with a sub Q code (time information) into the SDRAM 5.

In response to a request signal SREQ, the AV decoder 11 reads out data from the ATAPI controller 4.

The AV decoder 11 decompresses data in the MPEG2 format which is read out from the ATAPI controller 4, and supplies the decompressed data to the video encoder 13. The video encoder 13 converts the decompressed MPEG2 data to an analog video signal, and supplies the signal to a VideoOut terminal.

When data is to be reproduced from a CD, the AV decoder 11 sequentially receives PCM data (2,368 bytes) with a sub Q code which are stored in the SDRAM 5, from the ATAPI controller 4. Each time when the amount of the received data reaches 2,368 bytes, the AV decoder 11 lowers the level of the signal SREQ to stop the data transmission from the ATAPI controller 4, and sets an interrupt request flag.

Figure 5:
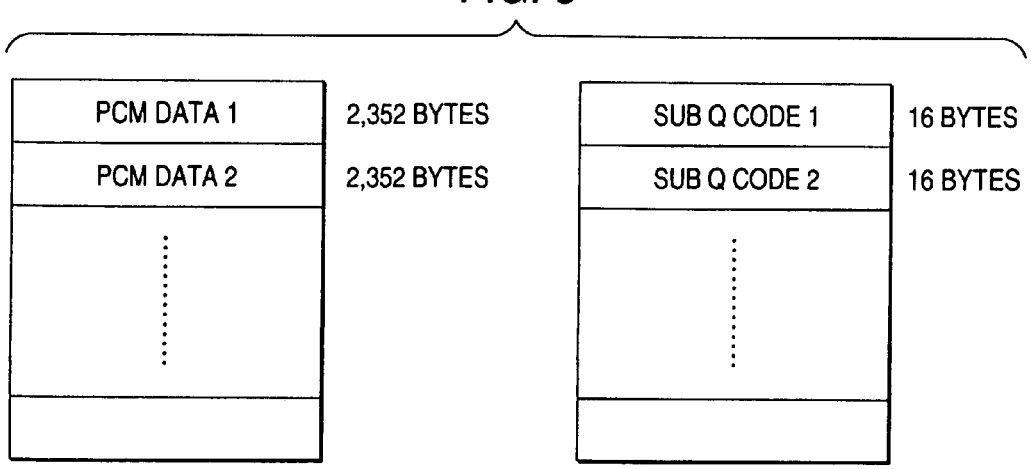
FIG. 5 is a diagram illustrating data management in an AV decoder 11.

FIG. 5 is a diagram illustrating the data management in the AV decoder 11. The AV decoder 11 separates a sub Q code from PCM data in PCM data with a sub Q code, and separately manages the code and the data. Specifically, the AV decoder 11 sets separately a sub Q code (time information) and PCM data into a register of the AV decoder 11.

Figure 6:
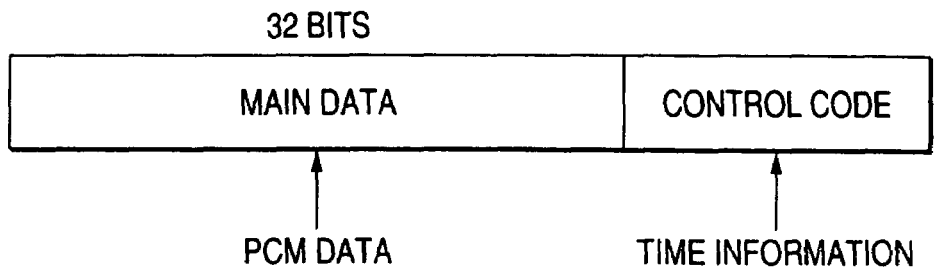
FIG. 6 is a diagram showing an example of the configuration of data output from the AV decoder 11.

The main MCU 102 reads out time information from the register, and outputs digital audio data from the AV decoder 11 while synchronizing the time information with PCM data. FIG. 6 is a diagram of digital audio data output from the AV decoder 11. As shown in the figure, PCM data is stored into a 32-bit main data area, and time information is stored into a control code area.

The AV decoder 11 supplies PCM data also to the DA converter 14. The DA converter 14 converts the received PCM data into an analog audio signal, and supplies the signal to an AudioOut terminal.

The tuner 21 selects a channel in the signal received through the antenna. The selector 22 selects one of the input signals of the antenna, the AudioIN terminal, and the VideoIN terminal, and supplies audio data to the AD converter 23, and video data to the ADC/Y/C separator 24. The AD converter 23 converts the analog audio data into digital data. The ADC/Y/C separator 24 converts the analog video data into digital data. The AV encoder 25 compresses the audio data and the video data into data in the MPEG2 format. The SDRAM 26 temporarily stores data which is converted into the MPEG2 format by the AV encoder 25.

Parameters for controlling the ATAPI controller 4, the AV decoder 11, and the AV encoder 25 are accumulated in the flash memory 101. The main MCU 102 is connected to the ATAPI controller 4, the AV decoder 11, and the AV encoder 25, and controls the operations of these components. When data is to be reproduced from a CD, the main MCU 102 detects the interrupt request flag of the AV decoder 11, calculates the amount of data transmitted from the ATAPI controller 4 on the basis of a change of a read pointer of the ATAPI controller 4, and judges whether the amount of transmitted data coincides with a multiple of 2,368 bytes or not. If the amount of transmitted data coincides with a multiple of 2,368 bytes, the main MCU 102 controls the AV decoder 11 to restart reading of data. If the amount of transmitted data does not coincide with a multiple of 2,368 bytes, the main MCU performs predetermined error processing, and then controls the AV decoder 11 to restart reading of data.

In accordance with instructions from the MCU 102, the tuner and timer MCU 103 controls the tuner 21, and displays time information and the like on the display device 104. The tuner and timer MCU 103 receives signals from the key operation unit 105 and a remote controller, and supplies the signals to the MCU 102.

In the above, the AV decoder 11 and the AV encoder 25 are separately disposed. Alternatively, an AV codec having both functions of the components may be used.

(2) Flowchart

Figure 7:
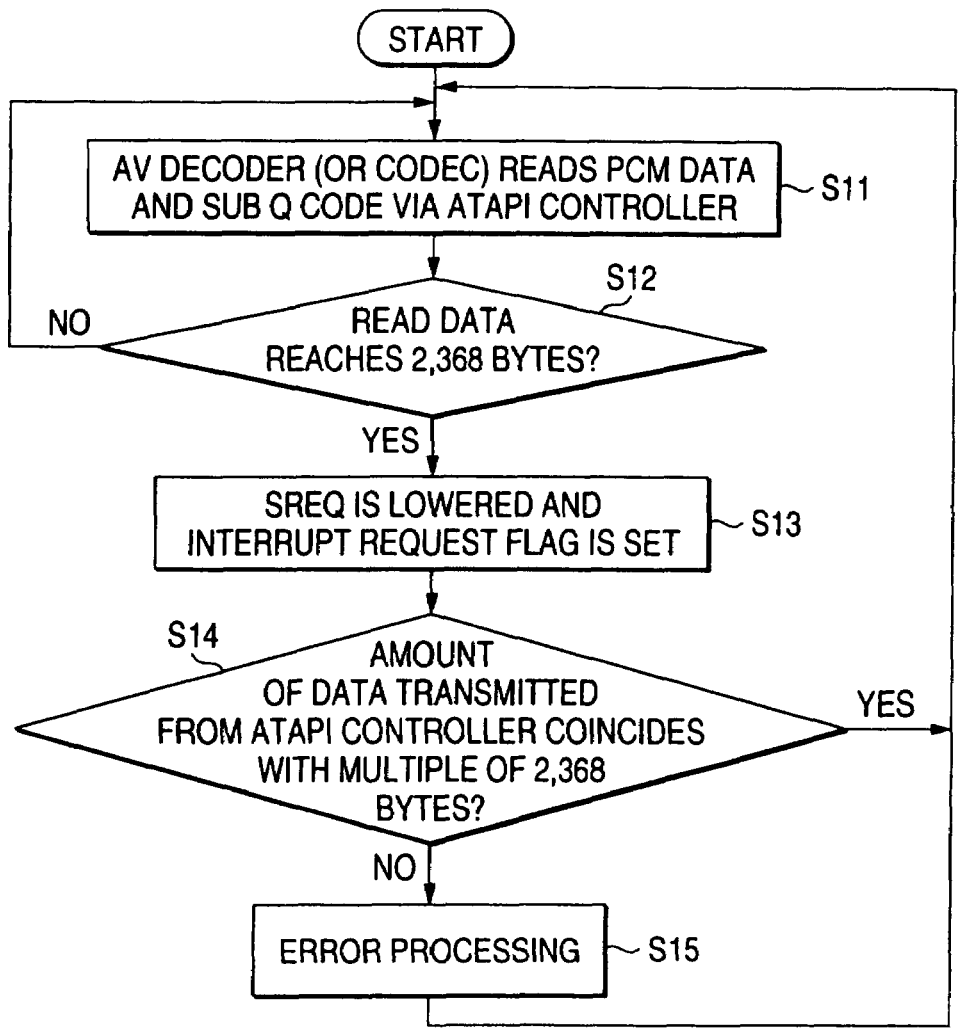
FIG. 7 is a flowchart of reproduction of PCM data.

FIG. 7 is a flowchart of reproduction of PCM data in the optical disc apparatus of the embodiment.

Step S11: The AV decoder 11 (or an AV codec) reads out PCM data (2,368 bytes) with a sub Q code, and sets the sub Q code as time information into the register.

Under the control of the main MCU 102, the AV decoder 11 (or the AV codec) generates digital audio data while synchronizing PCM data with time information, and supplies the digital audio data to the S/P DIF terminal.

Step S12: The AV decoder 11 (or the AV codec) judges whether the received data reaches 2,368 bytes or not. If the received data does not reach 2,368 bytes, the control returns to step S11. By contrast, if the received data reaches 2,368 bytes, the control transfers to step S13.

Step S13: The AV decoder 11 (or the AV codec) lowers the level of the request signal SREQ and sets the interrupt request flag.

Step S14: When the main MCU 102 detects the interrupt request flag, the main MCU judges whether the amount of data transmitted from the ATAPI controller 4 coincides with a multiple of 2,368 bytes or not. If the coincidence is attained, the control returns to step S11, and the AV decoder 11 (or the AV codec) restarts reception of data from the ATAPI controller 4. By contrast, if the coincidence is not attained, the control transfers to step S15.

Step S15: The predetermined error processing is performed, and the control returns to step S11.

(3) Conclusion

In the optical disc apparatus of the embodiment, PCM data (2,368 bytes) with a sub Q code is read out by the ATAPI controller 4, and therefore PCM data and time information can be easily synchronized with each other.

Since the data is read out from the ATAPI controller 4 to the AV decoder 11 while ascertaining coincidence between the amount of transmitted data and the amount of received data, synchronization of PCM data and time information can be prevented from being lost by the influence of noises or the like.

Since a dedicated line is not required for reading out PCM data, the configuration can be simplified, and the production cost can be lowered.

According to the invention, PCM data with time information is read out by an interface such as an ATAPI controller, and therefore PCM data and time information can be easily synchronized with each other.

What is claimed is:

1. An optical disc apparatus configured to perform recording and reproduction of information on a DVD and reproduction on a CD, said optical disc apparatus comprising:

a reader configured to read out the PCM data and the time information includes sub Q code which are recorded on the DVD and the CD;

a memory configured to once store the PCM data and the time information read out by the reader;

an ATAPI or a SCSI configured to read out, in a synchronized form, the PCM data and the time information that are synchronized and once stored in the memory; and an AV decoder or an AV coder configured to receive the PCM data and the time information in the synchronized form from the ATAPI or the SCSI.

* * * * *